United States Patent
Clough et al.

(10) Patent No.: US 11,267,382 B2
(45) Date of Patent: Mar. 8, 2022

(54) PASSENGER SEATING HEADREST WITH FRICTION ASSEMBLY

(71) Applicant: REINHOLD INDUSTRIES, INC., Santa Fe Springs, CA (US)

(72) Inventors: Robert Clough, Stevenson Ranch, CA (US); Sergio Millan, Chino, CA (US)

(73) Assignee: Reinhold Industries, Inc., Santa Fe Springs, CA (US)

(*) Notice: Subject to any disclaimer, the term of this patent is extended or adjusted under 35 U.S.C. 154(b) by 0 days.

(21) Appl. No.: 17/116,442

(22) Filed: Dec. 9, 2020

(65) Prior Publication Data
US 2021/0178948 A1    Jun. 17, 2021

Related U.S. Application Data

(60) Provisional application No. 62/947,066, filed on Dec. 12, 2019.

(51) Int. Cl.
| A47C 7/36 | (2006.01) |
| B60N 2/24 | (2006.01) |
| B60N 2/824 | (2018.01) |
| B60N 2/885 | (2018.01) |
| B60N 2/829 | (2018.01) |

(52) U.S. Cl.
CPC ............. *B60N 2/824* (2018.02); *B60N 2/829* (2018.02); *B60N 2/885* (2018.02)

(58) Field of Classification Search
CPC ... A47C 1/03255; A47C 1/03294; A47C 1/03; A47C 1/0303; A47C 1/03277; A47C 7/38; G09F 2017/0025; B60N 2/773; B60N 2/885; B60N 2/80; B60N 2/829; B60N 2/809

See application file for complete search history.

(56) References Cited

U.S. PATENT DOCUMENTS

| | | |
|---|---|---|
| 6,467,846 B2 | 10/2002 | Clough |
| 6,607,242 B2 | 8/2003 | Estrada et al. |
| 6,666,517 B2 | 12/2003 | Clough |
| 7,040,705 B2 | 5/2006 | Clough |
| 7,140,687 B2 | 11/2006 | Hoekstra et al. |
| 7,264,313 B2 | 9/2007 | Clough |
| 7,364,239 B2 | 4/2008 | Clough |
| 7,500,721 B2 | 3/2009 | Beroth et al. |
| 8,911,020 B2 | 12/2014 | Westerink et al. |
| 9,028,000 B2 | 5/2015 | Millan |
| 9,393,892 B1 | 7/2016 | Millan |
| 9,783,304 B2 | 10/2017 | Zheng et al. |
| 10,315,773 B1* | 6/2019 | Ahad ............. B60N 2/838 |
| 10,336,230 B2 | 7/2019 | Novin |
| 10,717,534 B2* | 7/2020 | Duckert ............. B61D 33/005 |
| 2004/0217639 A1* | 11/2004 | Clough ............. A47C 7/38 297/391 |
| 2007/0108827 A1* | 5/2007 | Clough ............. A47C 7/38 297/391 |
| 2016/0214513 A1* | 7/2016 | Millan ............. B60N 2/885 |
| 2018/0319302 A1 | 11/2018 | Novin et al. |
| 2021/0178948 A1* | 6/2021 | Clough ............. B60N 2/885 |
| 2021/0345780 A1* | 11/2021 | Clough ............. A47C 7/38 |

* cited by examiner

*Primary Examiner* — Shin H Kim
(74) *Attorney, Agent, or Firm* — Hahn Loeser & Parks LLP (57) ABSTRACT

The present disclosure relates to headrest assemblies for passenger vehicles. More specifically, the present disclosure describes a headrest assembly having a rail assembly with integrally formed friction assemblies.

20 Claims, 11 Drawing Sheets

PASSENGER SEATING HEADREST WITH FRICTION ASSEMBLY

This patent application claims priority to and benefit of U.S. Provisional Application No. 62/947,066, filed Dec. 12, 2019, which is incorporated herein by reference.

TECHNICAL FIELD

This disclosure relates generally to headrests for seats. More specifically, the present disclosure relates to headrests for use with passenger seating for passenger vehicles, such as a passenger aircraft.

BACKGROUND

Passenger vehicles relied on for mass transportation, such as buses, trains, aircraft, or the like, provide a service for moving passengers from one location to the next. Passenger safety is a primary focus for seating systems and, more specifically, for a headrest of a seating system. In combination with safety, passenger comfort must also be considered. To accommodate passenger comfort and passenger safety, complexities lending to increased functionality and/or adjustability have been introduced. By example, headrests have been developed which adjust vertically, horizontally, and may even tilt. The addition of these complexities has increased the requisite interaction between a passenger and the headrest in order to affect any adjustments. The addition of these complexities additionally increases the cost, the weight, and the components of a headrest assembly.

The resistance imparting assembly, as found in U.S. Pat. No. 7,364,239 to Clough, which is herein incorporated by reference for this purpose, is illustrative of a level of complexity the present disclosure sets out to overcome. Specifically, such a resistance imparting assembly may rely on a leaf spring assembly which is secured between opposing faces of the components of a headrest assembly. The leaf spring assembly applies pressure to a face of the headrest assembly to impart friction to the headrest assembly. The leaf spring arrangement is an independent component which must be manufactured separately from the headrest assembly. Space must also be provided to accommodate the addition of the leaf spring between components in the arrangement of the headrest assembly. The leaf spring arrangement imparts a resistant force at the leaf spring, but because the leaf spring is positioned between headrest components it also imparts friction or stresses on adjoining components of the headrest assembly. Ultimately, the leaf spring assembly provides a variable, or inconsistent, amount friction over its range of movement. This variable amount friction may result from friction generated between adjoining components of the headrest assembly, independent of the spring assembly. The variable amount of friction may also be friction resulting from stresses imparted on a roller assembly offset from the resistance imparting assembly.

What is needed is a passenger vehicle headrest that remains adjustable for passenger comfort while reducing the complexity for adjustment. More specifically, what is needed is a passenger vehicle headrest that produces a consistent amount of friction over the headrest's range of movement. Also, what is needed is a passenger vehicle headrest that remains adjustable without imparting undue and uneven stresses on adjoining components.

SUMMARY

The present disclosure relates generally to headrests for seats. More specifically, the present disclosure relates to headrests for use with passenger seating for passenger vehicles, such as a passenger aircraft.

A passenger seating headrest assembly of the present disclosure may comprise a headrest center plate having a backside. A rail assembly is secured to the backside of the headrest center plate and has a pair of guides. Each guide of the pair of guides is positioned at a respective lateral side of the rail assembly where the lateral sides extend in a vertical direction. A mounting plate and a cover plate may be secured together. A pair of rollers may be secured to the mounting plate and/or the cover plate where the pair of rollers mate with a respective guide of the pair of guides. The headrest center plate and the rail assembly move vertically relative the mounting plate and the cover plate. The passenger seating headrest assembly further comprises a friction assembly having a friction leaf. The friction leaf is positioned within a void which extends through at least a part of a thickness of the rail assembly. Further, the friction leaf may be formed from the thickness of the rail assembly.

Additional examples of the passenger seating headrest assembly may further comprise the following. In some examples, the friction leaf comprises a resistance structure and a friction leaf engaging structure. The resistance structure forces the friction leaf engaging structure against the mounting plate. In some examples, in the void the friction leaf extends from a front side of the rail assembly to a back side of the rail assembly. In some examples, the rail assembly comprises a stabilizing thickness isolated at a bottom of the rail assembly and positioned adjacent to the void. The length of the stabilizing thickness may be less than a length of the void. The stabilizing thickness may engage the mounting plate and the cover plate an entire length of travel of the headrest center plate. In some examples, the rail assembly comprises a stabilizing thickness extending a length of the rail assembly between a friction leaf engaging surface and a bottom of the rail assembly. The stabilizing thickness may extend the entire width of the rail assembly with the exception of the void.

The passenger seating headrest assembly of the present disclosure may comprise two or more friction assemblies. In one example, the passenger seating headrest assembly comprises two friction assemblies where the two friction assemblies are symmetrical about a longitudinal axis of the rail assembly extending a length of the rail assembly.

In each of the examples above, the one or more friction assemblies may be positioned relative other components of the passenger seating headrest assembly. In some examples, the friction assembly may be offset from the pair of rollers and the pair of guides in a direction of the length of the rail assembly. In some examples, the friction assembly is maintained to a lower half of the rail assembly.

In some examples the rail assembly may further comprise a groove positioned centrally within the rail assembly. The groove may extend in the vertical direction. The groove may receive a central roller having a rotational axis parallel to the rotational axis of the pair of rollers. The central roller may be offset from the pair of rollers in a direction of the length of the headrest assembly. The central roller may abut a topside of the groove in a raised position and/or the central roller may abut a bottom side of the groove in a lowered position. In some examples, the friction assembly is positioned between the groove and one guide of the pair of guides. In some examples, the passenger seating headrest assembly may comprise only three rollers.

The rail assembly may further comprise a top end thickness abutting the headrest center plate for securing the rail assembly to the headrest center plate. In some examples, the rail assembly void may be formed between the rail assembly and the headrest center plate below the top end thickness and the cover plate may be positioned within the rail assembly void. The top end of the cover plate may further engage the top end thickness in a lowered position to define a stop for the lowered position.

The foregoing and other objects, features, and advantages of the examples will be apparent from the following more detailed descriptions of particular examples as illustrated in the accompanying drawings wherein like reference numbers represent like parts of the examples.

BRIEF DESCRIPTION OF THE DRAWINGS

Reference is made to the accompanying drawings in which particular examples and further benefits of the examples are illustrated as described in more detail in the description below, in which.

DETAILED DESCRIPTION

Figure 1:
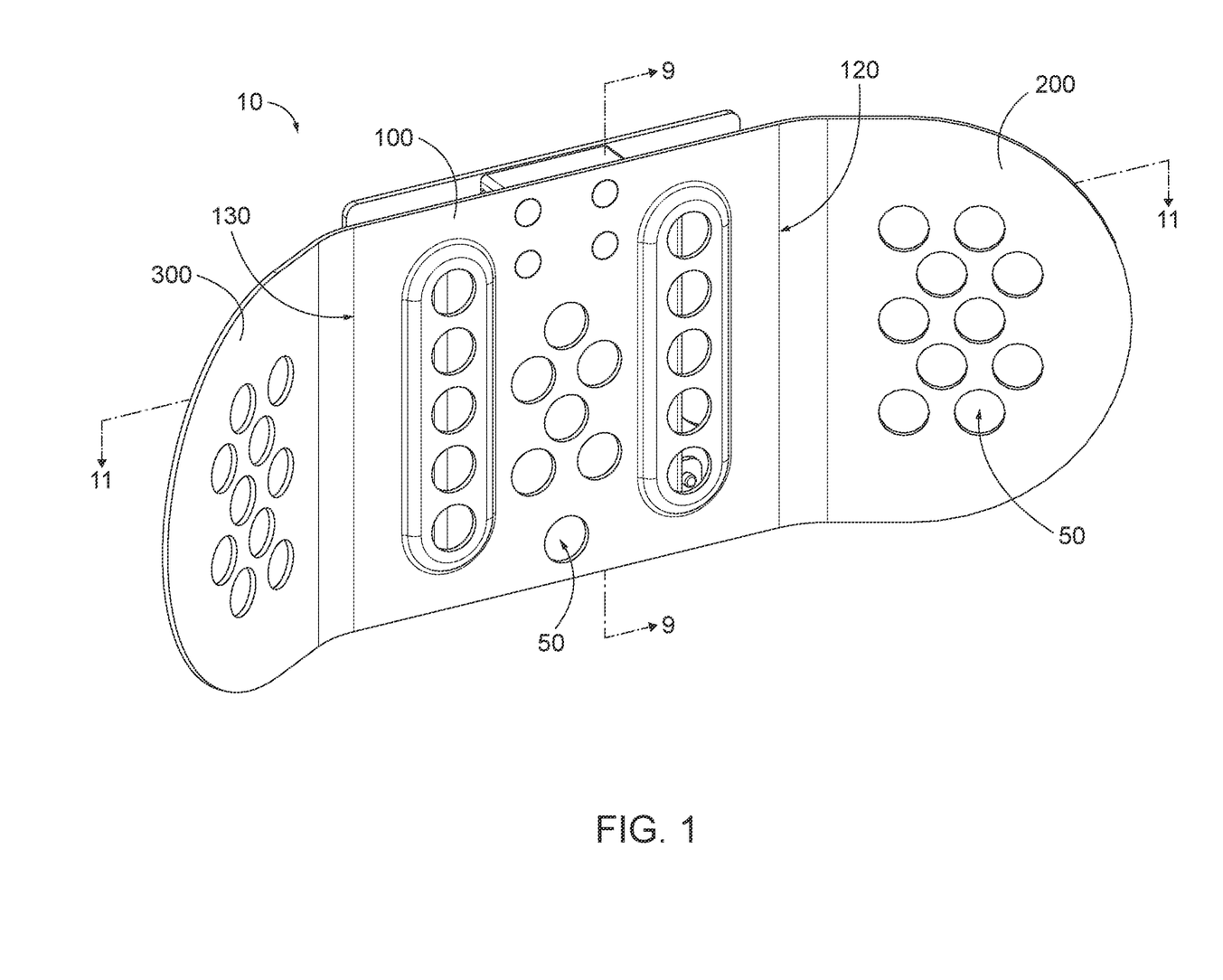
FIG. 1 is a front perspective view of a seat headrest assembly in a lowered position, in accordance with an example of the disclosure.
Figure 2:
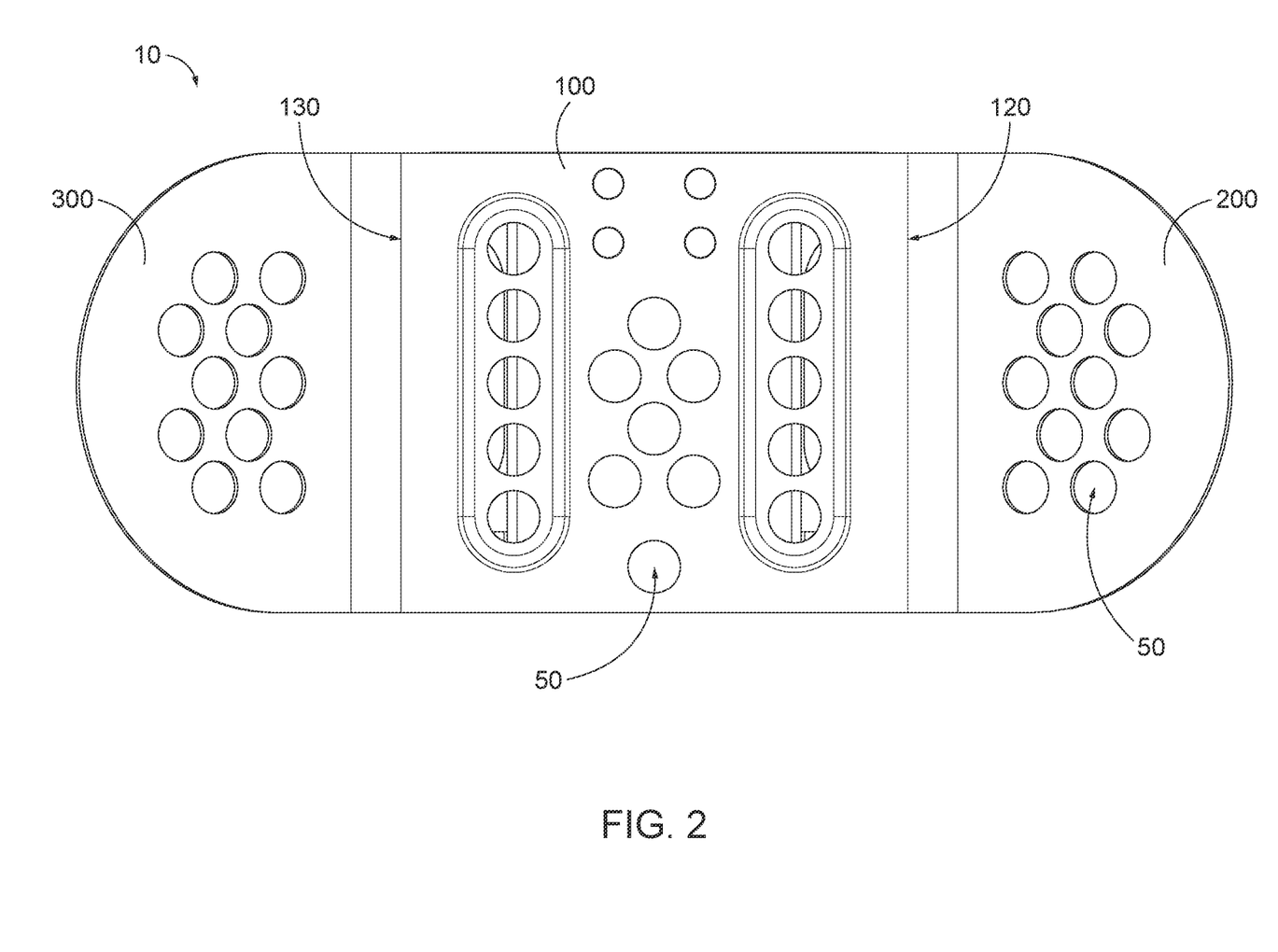
FIG. 2 is a front view of a seat headrest assembly in a lowered position, in accordance with an example of the disclosure.
Figure 5:
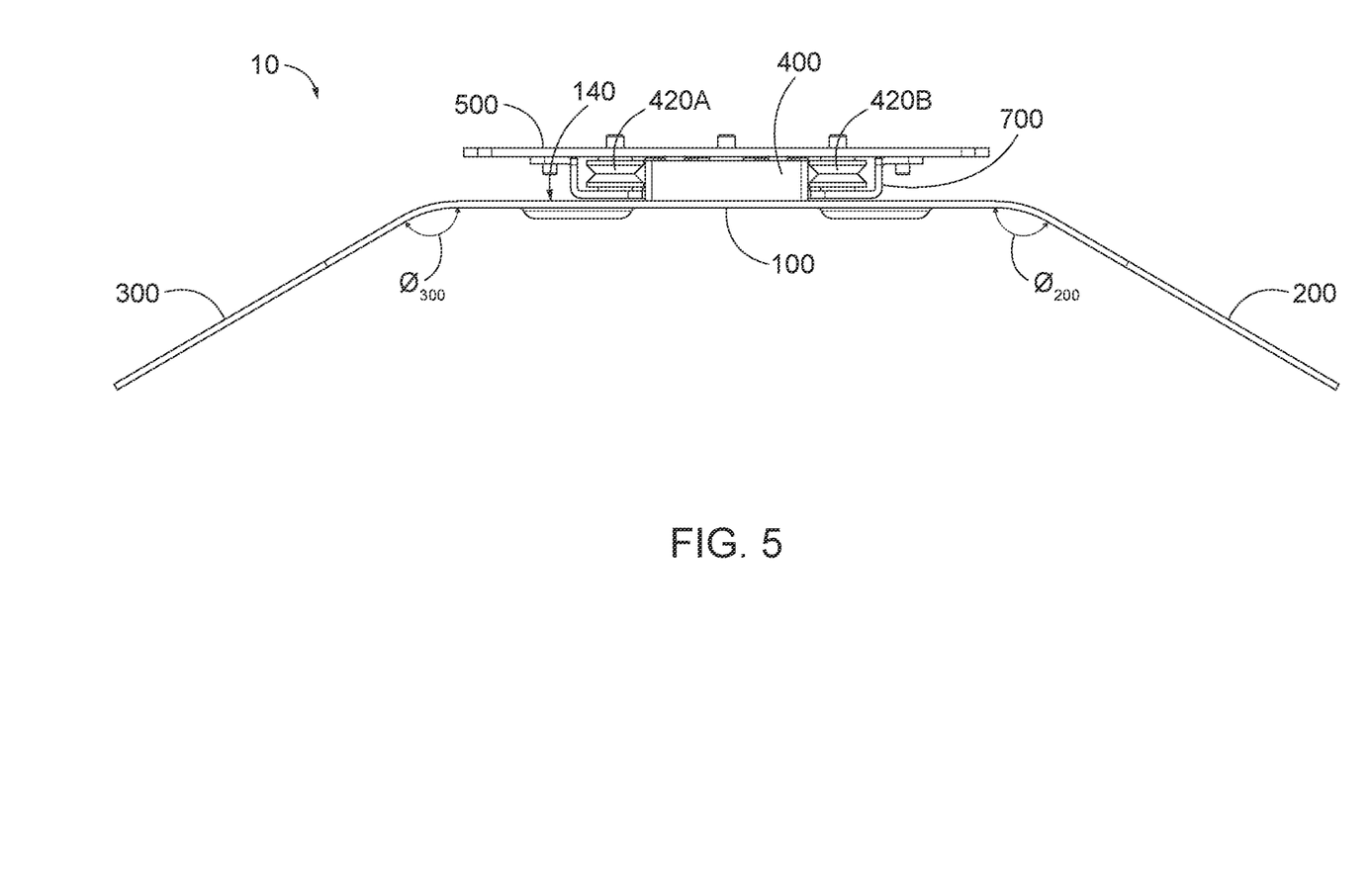
FIG. 5 is a top view of a seat headrest assembly in a lowered position, in accordance with an example of the disclosure.

Referring to FIGS. 1-2, a seat headrest assembly 10 is illustrated. FIG. 1 is a front perspective view of the seat headrest assembly 10 comprising a headrest center plate 100 with two opposing headrest side panels, a first side panel 200 and a second side panel 300. FIG. 2 is a front view of the seat headrest assembly 10 comprising a headrest center plate 100 with two opposing headrest side panels, a first side panel 200 and a second side panel 300. In FIGS. 1-2 the headrest assembly 10 is in a lowered position. The headrest side panels 200, 300 are each respectively attached to or extend from respective lateral ends of the headrest center plate 100, a first lateral end 120 and a second lateral end 130. In the example of FIG. 1, the headrest side panels 200, 300 are extensions of the headrest center plate 100. Each headrest side panel 200, 300 extend from the headrest center plate 100 at an angle oblique $\theta_{200}$, $\theta_{300}$ to the headrest center plate 100 (as best seen in FIG. 5). More specifically, each headrest side panel 200, 300 may extend from the headrest center plate 100 at the same oblique angle (as illustrated by FIG. 2) but in opposing fashion. In FIGS. 1-2, the headrest side panels 200, 300 are angled relative the headrest center plate 100 in a forward manner so to wrap around the sides of a passenger's head.

Figure 3:
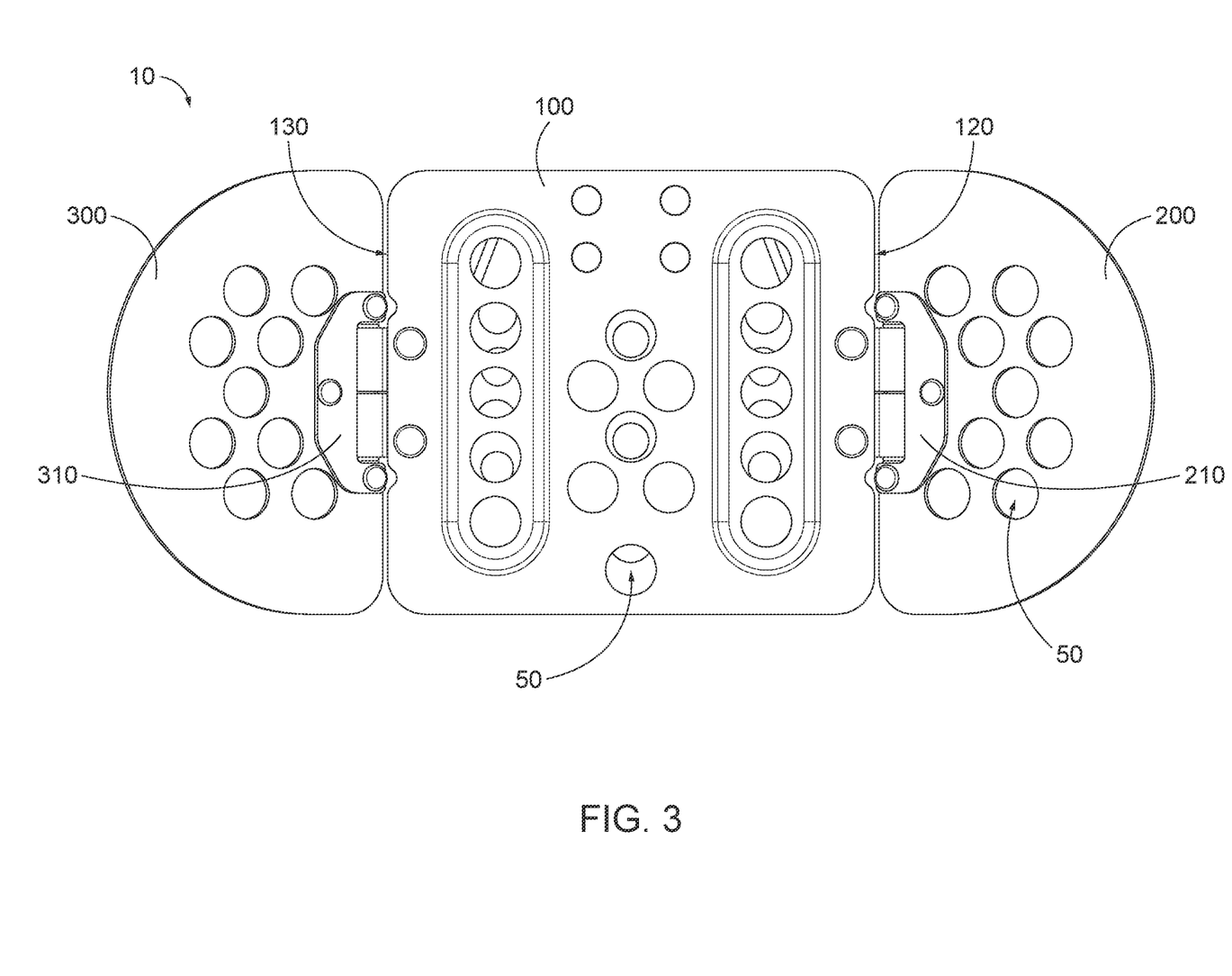
FIG. 3 is a front view of a seat headrest assembly in a lowered position, in accordance with an example of the disclosure.

FIG. 3 illustrates yet another variation of a seat headrest assembly of FIGS. 1-2. In FIG. 3, each respective lateral end 120, 130 is attached to the headrest center plate 100 by way of a hinge assembly 210, 310, respectively, that allow the side panels 200, 300 to move relative the headrest center plate 100. The hinge assemblies 210, 310 may further comprise detents. The detents provide either friction stops or hard stops for limiting the movement, and in the example illustrated by FIG. 3, the rotation of the side panels 200, 300 relative to the respective lateral end 120, 130 of the headrest assembly. The hinge assemblies 210, 310 of FIG. 3 provide for the oblique angle of each headrest side panel 200, 300 to be adjusted relative the headrest center plate 100. Additionally, or alternatively, the hinge assemblies 210, 310 of FIG. 3 allow the side panels 200, 300 to be positioned in the same plate, or aligned with, the headrest center plate 100.

Figure 4:
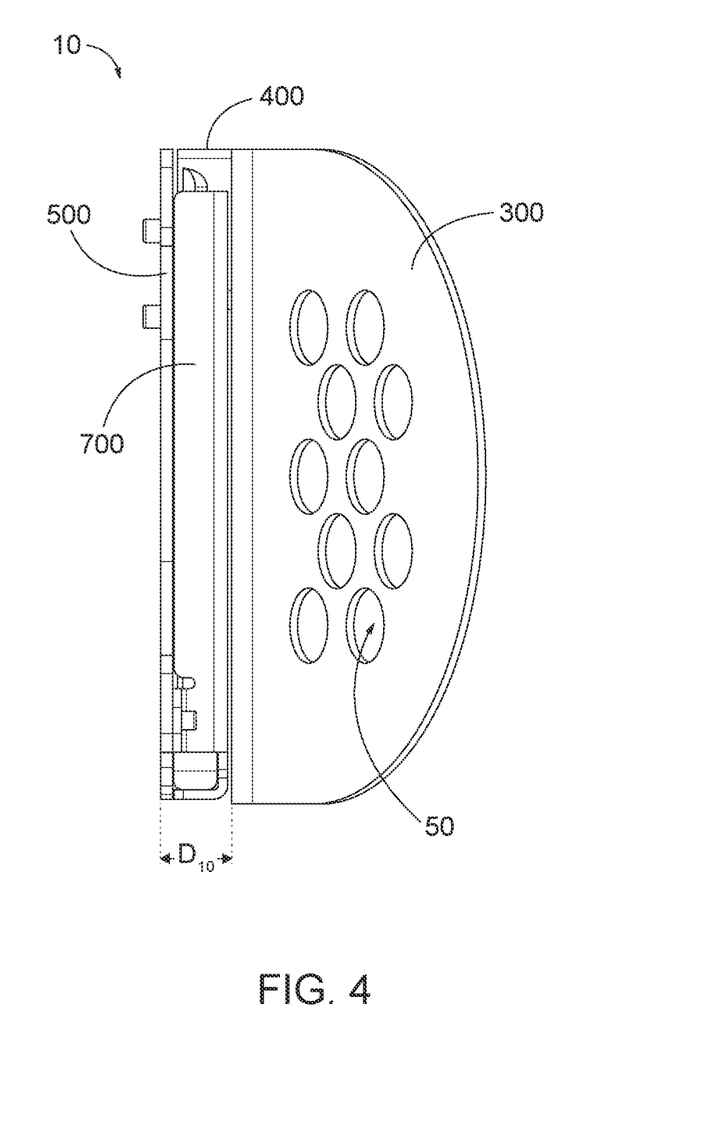
FIG. 4 is a side view of a seat headrest assembly in a lowered position, in accordance with an example of the disclosure.

FIGS. 4-5 illustrate a side view and top view, respectively, of the seat headrest assembly 10. FIG. 4 is a side view of the seat headrest assembly 10. In FIG. 4 the side panel 300 extending from the center plate is illustrated. Also illustrated are the mounting plate 500, the cover plate 700, and the rail assembly 400. FIG. 5 is a top view of the seat headrest assembly 10. In FIG. 5 the headrest center plate 100 with the first side panel 200 and the second side panel 300 is attached to a rail assembly 400. The rail assembly is substantially concealed between the cover plate 700 and the mounting plate 500 when in the lowered position. As used herein, substantially means 75% or more. The rail assembly 400 extends from between the cover plate 700 and the mounting plate 500 when in the raised position. In FIG. 5, the rail assembly 400 is secured directly to a backside 140 of the headrest center plate 100. The cover plate 700 is secured to the mounting plate 500. The mounting plate 500 is positioned between the backside of 140 of the headrest center plate 100 and the mounting plate 500 which is relied on for attaching the headrest assembly 10 to a passenger seating assembly. The mounting plate 500 may be secured to a seat assembly by any means known in the art, including, but not limited to, bolts, screws, clips, clamps, or the like.

As illustrated in each of FIGS. 1-5 weight reducing apertures 50 may be provided in one or more of each of the headrest center plate 100, the first side panel 200, the second side panel 300, the mounting plate 500, and/or the cover plate 700. The weight reducing apertures 50 may be provided to reduce the overall weight of the seat headrest assembly 10 in passenger vehicles where weight must be reserved for cargo or passengers, such as in aircraft. In the present figures, the weight reducing apertures expose features that would otherwise be entirely concealed, if there were no weight reducing apertures.

Figure 6:
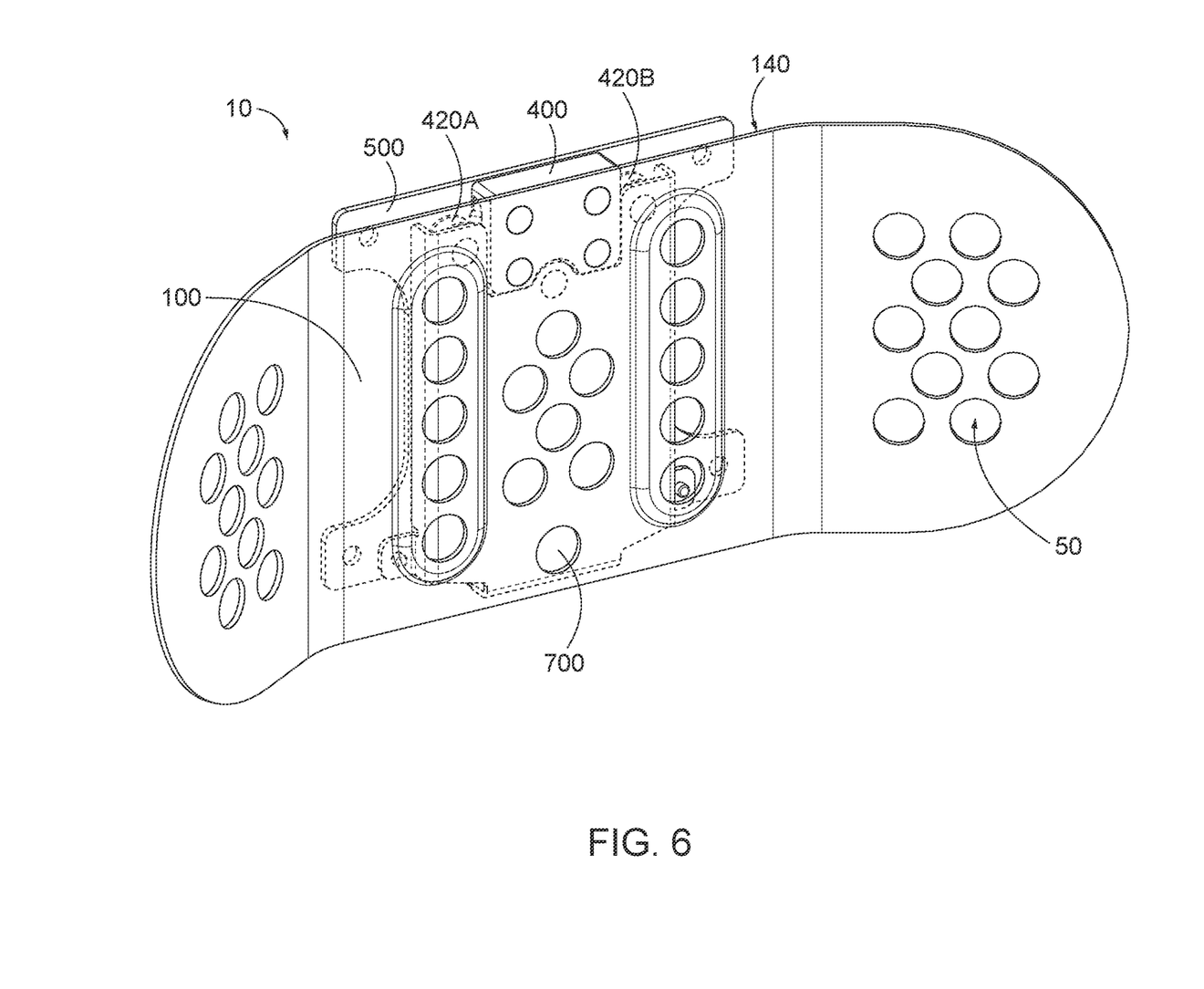
FIG. 6 is a front perspective view of a seat headrest assembly in a lowered position with the front plate semi-transparent to illustrate the center post cover and mounting plate, in accordance with an example of the disclosure.

FIG. 6 is a front perspective view of a seat headrest assembly 10 in a lowered position. In FIG. 6, the center plate 100 is provided in a semi-transparent manner to illustrate the cover plate 700, the rail assembly 400, and mounting plate 500, which are otherwise concealed, as illustrated by FIG. 1.

Figure 11:
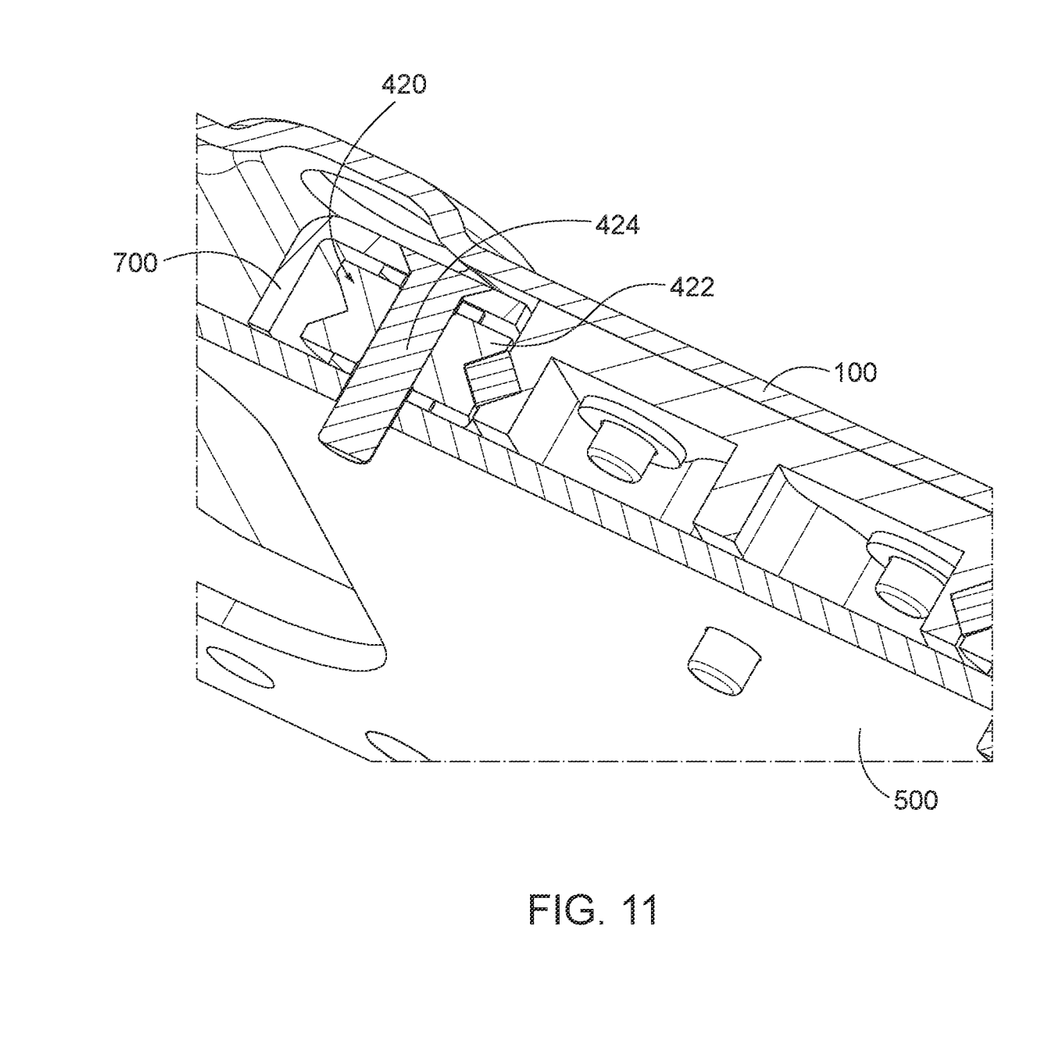
FIG. 11 is a partial view of the cross-section of the seat headrest assembly as taken at line 11-11 of FIG. 1

As noted above, the rail assembly 400 is secured directly to a backside 140 of the center plate 100 and travels with the center plate 100. In this example, the rail assembly 400 is attached to the backside 140 of the headrest center plate 100 by way of a bolted connection. Any connection known in the art may be relied on to attach the rail assembly to the backside of the headrest center plate including, but not limited to, screws, adhesive, clamps, a combination thereof, or the like. In contrast, the cover plate 700 and the mounting plate 500 are secured to one another and maintain their position relative to a passenger seating assembly when the seat headrest assembly 10 is attached to the passenger seating assembly. Positioned between the cover plate 700 and the mounting plate 500 are rollers 420A, 420B which are maintained between the cover plate 700 and the mounting plate 500. The rollers 420A, 420B may be secured to the cover plate 700 and/or the mounting plate 500. By example, a roller bearing axis 424 may extend between the cover plate 700 and the mounting plate 500 on which a roller bearing 422 would rotate, such as that illustrated by FIG. 11.

Figure 7:
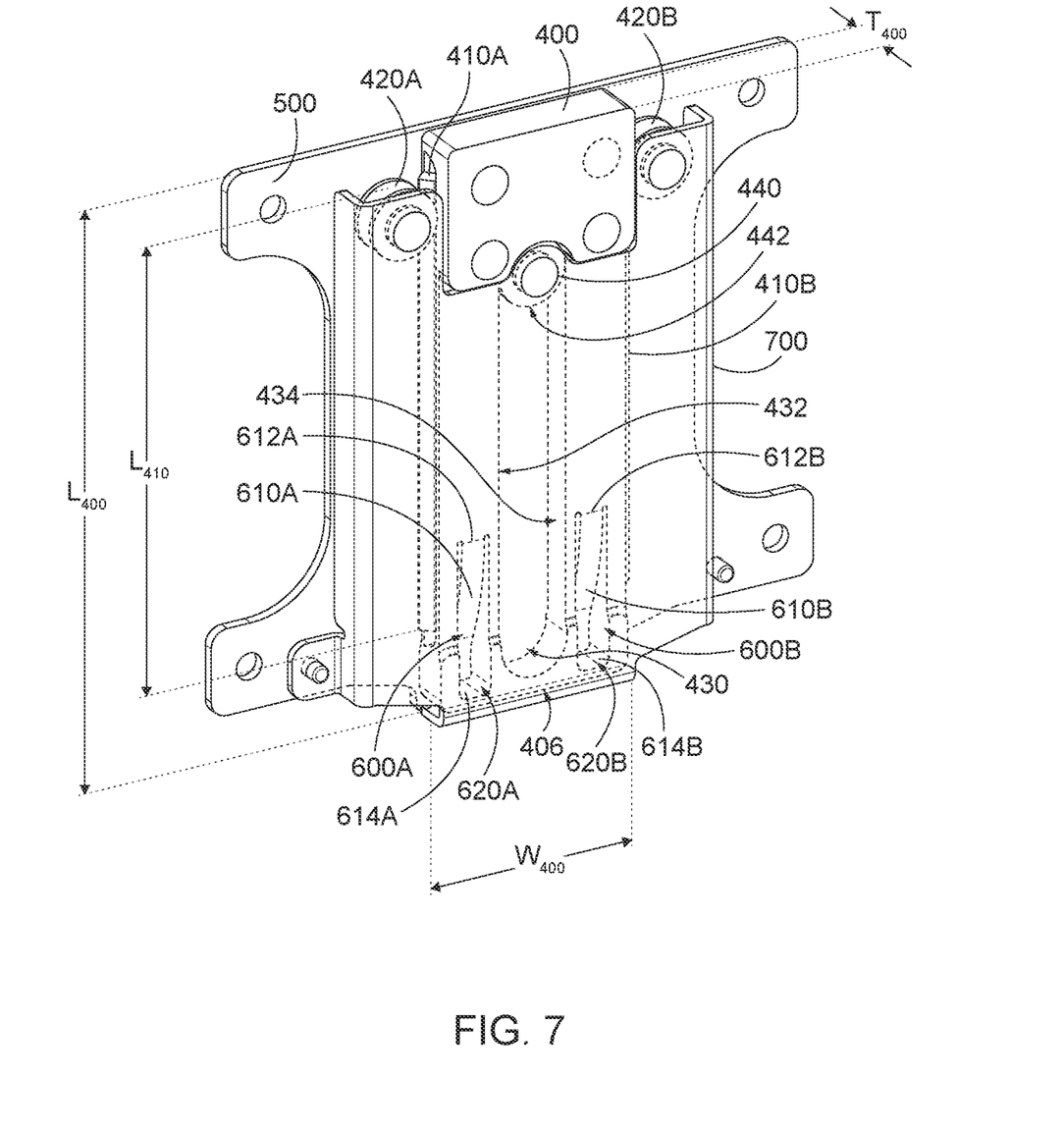
FIG. 7 is a front perspective view of a seat headrest assembly in a lowered position with the front plate removed and the center post cover semi-transparent to illustrate the roller and guide assembly, in accordance with an example of the disclosure.
Figure 8:
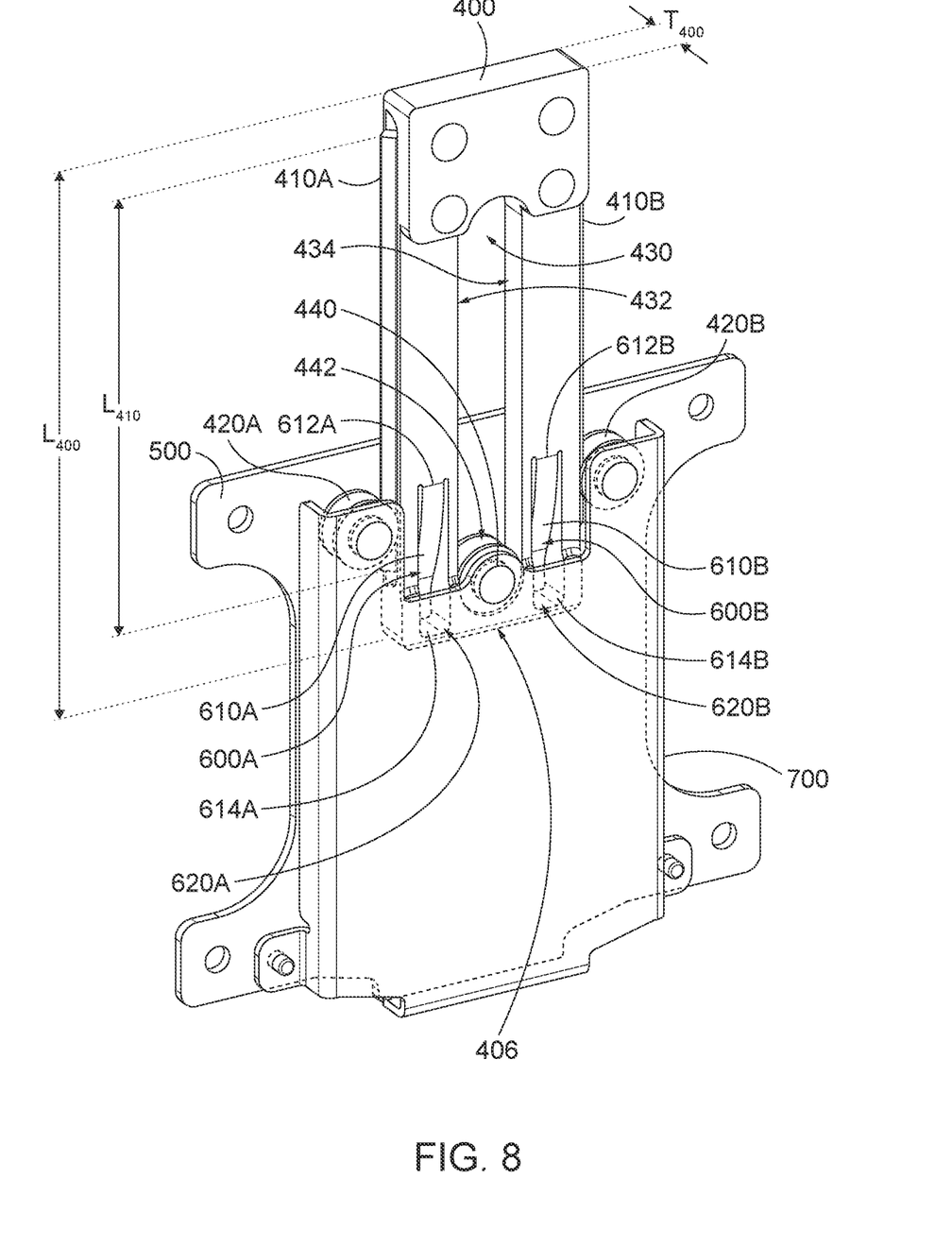
FIG. 8 is a front perspective view of seat headrest assembly in a raised position with the front plate removed and the center post cover semi-transparent to illustrate the roller and guide assembly, in accordance with an example of the disclosure.

FIG. 7 is a front perspective view of the cover plate 700, the mounting plate 500, and the rail assembly 400 in a lowered position. FIG. 8 is a front perspective view of the cover plate, 700, the mounting plate 500, and the rail assembly 400 in a raised position. In FIGS. 7-8, the cover plate 700 is provided in a semi-transparent manner to illustrate the rail assembly 400 and the rollers 420A, 420B which are otherwise concealed by the cover plate 700 when in a lowered position. The rail assembly 400 comprises one or more guides 410A, 410B. In the present example, inverted v-shaped guides 410A, 410B extend a guide length $L_{410}$ in a direction of the length $L_{400}$ of the rail assembly 400 on opposing sides of the rail assembly 400. The guides 410A, 410B are inverted v-shaped guides that mate with v-shaped rollers 420A, 420B. Specifically, the apex of the guides 410A, 410B are inserted into the v-shaped configuration of the rollers 420A, 420B for providing support between the guide 410A, 410B and the respective rollers 420A, 420B laterally in a direction of the rail assembly width $W_{400}$ (as illustrated by FIG. 7) and the headrest assembly depth $D_{10}$ at its center (as illustrated by FIG. 4) while maintaining movement in a direction of the guide length $L_{410}$, or vertically. Please note, although the mating guide and the rollers may be a v-shape/inverted v-shape configuration herein the arrangement may be swapped between the rollers and the guide, such that the guide is v-shaped and the rollers are inverted v-shapes. Additionally, or alternatively, additional mating arrangements are contemplated herein such as u-shapes, rectangular grooves and rectangular rollers (or vice versa), tracks and runners, a combination thereof or any slide and/or rolling arrangement In the present example, two rollers 420A, 420B are rotatably secured between the mounting plate 500 and the cover plate 700 such that they interface with, lock into, and/or they roll upon the surface of the inverted v-shaped groove of the rail assembly 400 when fully assembled. The rollers 420A, 420B may be directly secured to the mounting plate 500, the cover plate 700, or both. The rail assembly 400 may additionally comprise a central groove 430. The central groove 430 may be an aperture extending through the thickness $T_{400}$ of the rail assembly 400. When assembled, a central roller 440, rotatably attached to the mounting plate 500 or the cover plate 700, is positioned within the central groove 430 to provide additional stability between the rail assembly 400 and the mounting plate 500. In the example of FIGS. 7-8, the central roller 440 is offset both vertically and laterally from either roller 420A, 420B on a surface of the mounting plate 500, thereby providing a third point of contact and support. The central roller 440 has a rotational axis that is parallel with the rotational axis of each roller 420A, 420B. In the example of FIGS. 7-8, the central groove 430 has opposing support surfaces 432, 434 which engage the rolling surface 442, or outside circumference, of the central roller 440. The central roller 440 is thereby maintained within the central groove 430 in a lateral direction while providing movement between the central roller 440 and the central groove 430 in a vertical direction. In contrast, the v-shaped configuration, or mating relationship, between the side rollers 420A, 420B and the side guides 410A, 410B not only secures the rail assembly 400 between the opposing side rollers 420, preventing lateral movement, but it additionally locks each side roller 420 at the respective side guides 410. This prevents the headrest center plate 100, attached directly to the rail assembly 400, from separating from the mounting plate 500, which is secured directly to the side rollers 420. Still yet, vertical movement is provided between the center plate 100 and the mounting plate 500 without separating from one another.

Still referring to FIGS. 7-8, two friction assemblies 600A, 600B are illustrated. Each friction assembly 600A, 600B comprises a friction leaf 610A, 610B. The friction leaf 610A, 610B is formed in a void 620A, 620B. The void 620A, 620B is an opening within thickness $T_{400}$ of the rail assembly 400 in which the friction leaf 610A, 610B is positioned and may independently flex. As used herein, independently flex means the friction leaf 610A, 610B is free to extend into the respective void 620A, 620B without impact on or from adjoining structures such as, for example, the cover plate 700. In this example, the friction leaf 610A, 610B is independent of the rail assembly 400 on all sides except one, at the first end 612A, 612B of the friction leaf. Referring to FIG. 8 the friction leaf 610A, 610B is formed from and extends from the thickness $T_{400}$ of the rail assembly 400 within the void 610A at the first end 612A of the friction leaf 610A. A second end 614A of the friction leaf 610A extends from the void 620A and/or thickness $T_{400}$ of the rail assembly 400 where the second 614A end and/or a section of the friction leaf 610A between the first end 612A and the second end 614B engage an adjoining component of the headrest assembly 10. In this example, the friction leaf 610A engages the adjoining mounting plate 500. By engaging the adjoining mounting plate 500, friction is generated between the mounting plate 500 and each respective friction leaf 610A, 610B of each friction assembly 600A, 600B. In the present example as illustrated by FIGS. 7-8, two friction assemblies 600A, 600B are provided and are symmetrically spaced in the rail assembly 400 between the opposing rollers 420A, 420B about a vertical axis of the rail assembly 400. The two friction assemblies are separated by the central groove and the central roller. It is appreciated herein that only one friction assembly may be provided. It is also appreciated herein that one friction assembly may comprise two or more friction leaves. Moreover, it is appreciated herein that more than two friction assemblies may be provided.

Each friction leaf 610A, 610B may comprise a resistance structure 630A, 630B. In the present example and with particular reference to FIG. 9, the resistance structure 630B is a curvature extending from the first end 612B to the second end 614B of the friction leaf 610B. The present resistant structure 630B is a curvature where the friction leaf 610B extends from a front side 402 of the rail assembly and transitions to the back side 404 and extending beyond the back side 404, of the rail assembly 400 where it engages the mounting plate 500. This curvature provides increased rigidity and maintains an applied force against the mounting plate 500 to impart friction on the mounting plate 500. This curvature additionally allows the force imparted through the friction leaf 610B to extend into and through the remaining thickness $T_{400}$ of the rail assembly 400 within the void 620B.

Figure 9:
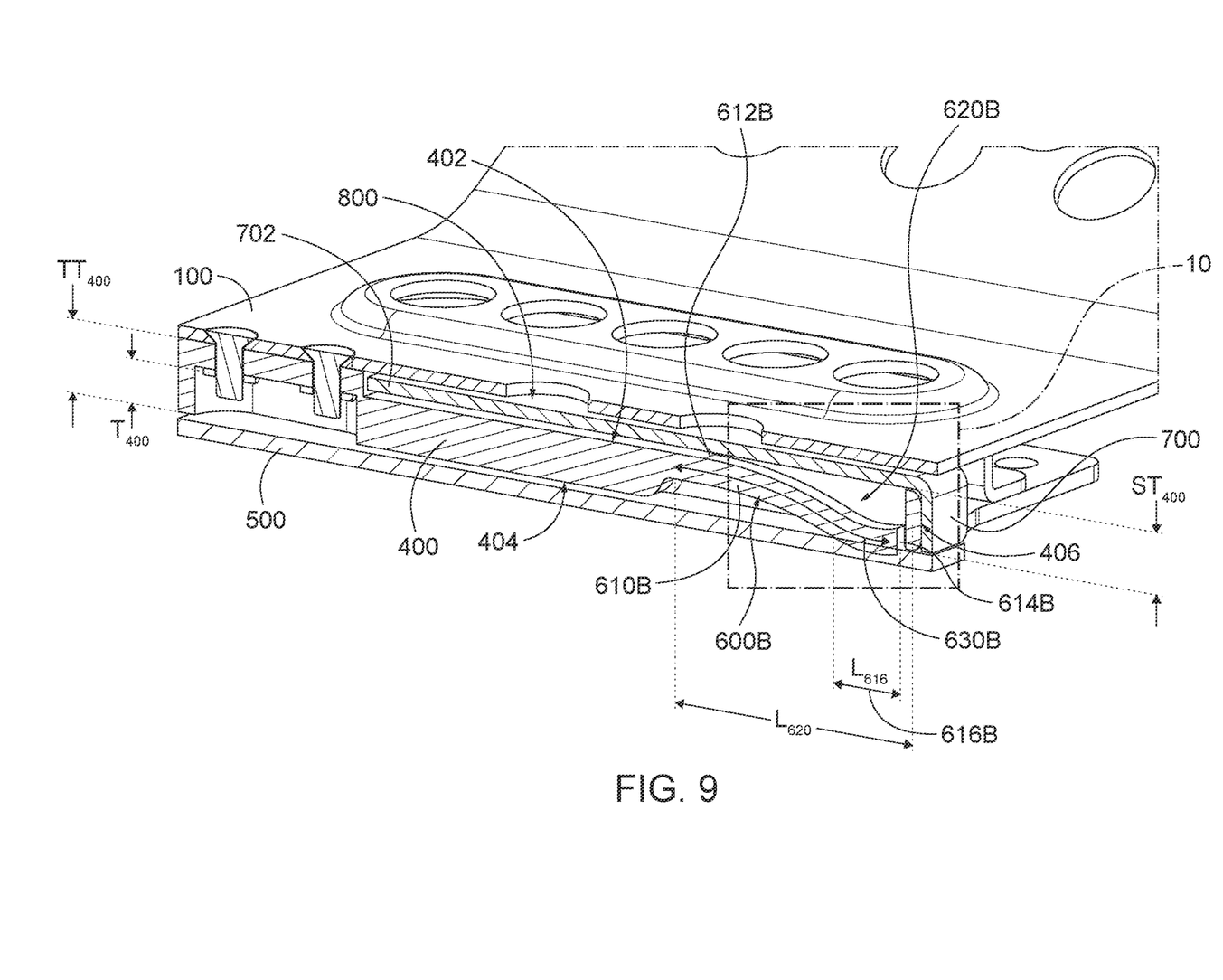
FIG. 9 is a cross-section of the seat headrest assembly in a lowered position as taken at line 9-9 of FIG. 1.

Still referring to FIGS. 7-9, the friction assemblies 600A, 600B are positioned relative the bottom end 406 of the rail assembly 400. This allows the rail assembly 400 and, thereby, the cover plate 700 to move between the raised position and the lowered position while maintaining friction between each friction leaf 610A, 610B and the mounting plate 500. Additionally, the section of each friction leaf 610A, 610B which engages the mounting plate 500, referred to herein as a friction leaf engaging surface 616A, 616B, may additionally be positioned below the guides 410A, 410B of the rail assembly 400 to remain independent of the guides 410A, 410B and the rollers 420A, 420B. This eliminates any undue stress on the rollers 420A, 420B due to the force imparted between the friction leaf 610A, 610B and the mounting plate 500. The friction leaf engaging surface 616A, 616B is additionally positioned at a location where the thickness $T_{400}$ of the rail assembly 400 increases. This increased thickness is referred to herein as a stabilizing thickness $ST_{400}$.

Figure 10:
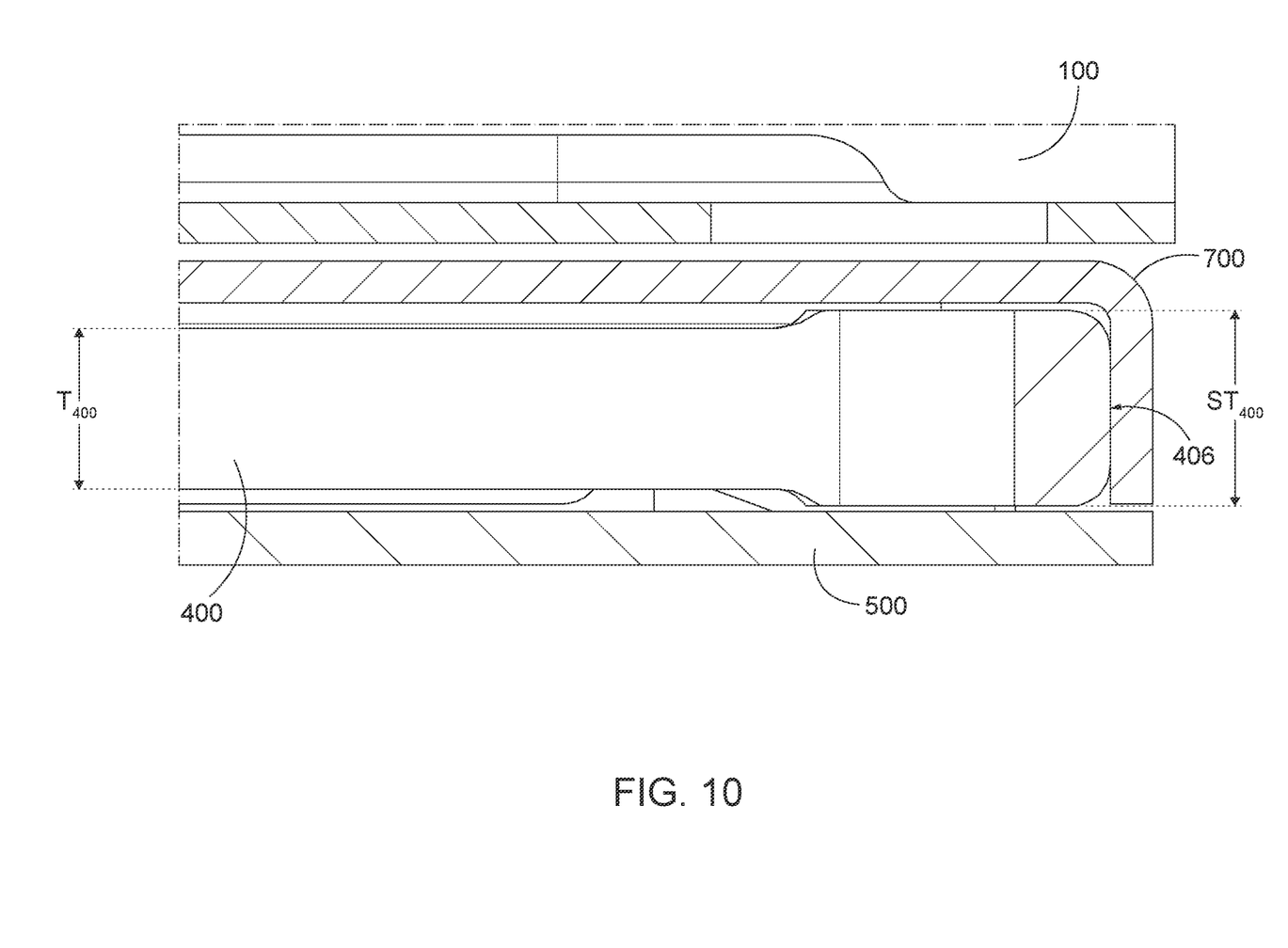
FIG. 10 is a partial view of a friction assembly at 10 of FIG. 9, in accordance with an example of the disclosure.

The stabilizing thickness $ST_{400}$ is best illustrated by FIG. 10 and is positioned at the friction leaf engaging surface 616A, 616B. The stabilizing thickness $ST_{400}$ may be limited to the length $L_{616}$ friction leaf engaging surface 616B and extending to the bottom 406 of the rail assembly 400, as illustrated by FIG. 9. FIG. 9 is a cross-section of the headrest assembly 10 of the present disclosure in a lowered position at line 9-9 of FIG. 1. As illustrated by FIG. 9, the stabilizing thickness $ST_{400}$ may be less than the length $L_{620}$ of the void 620B of the rail assembly 400. In this example, the stabilizing thickness $ST_{400}$ is isolated to the bottom 406 of the rail assembly 400, is positioned to the bottom of the void 620B, and extends the entire width $W_{400}$ of the rail assembly, aside from the voids 620A, 620B. In other examples, the stabilizing thickness may be positioned at an intermediate location on the rail assembly, may only extend a partial width of the rail assembly, and/or may even be isolated to one side or another of each respective void. In some examples the stabilizing thickness may be maintained to both sides of the void. Regardless, the stabilizing thickness is maintained at the friction leaf engaging structure 614A, 614B. By maintaining the stabilizing thickness $ST_{400}$ at the friction leaf engaging structure 614A, 614B the friction generated between the friction leaf and the mounting plate 500 is maintained at this location over the entire distance of travel of the headrest assembly 10. The friction does not transfer through the rail assembly 400 to impart stresses on the rollers 420A, 420B. The friction does not transfer along the face of the cover plate 700, the rail assembly 400, and/or the mounting plate 500 separate and independent of the position of the friction leaf 610A, 610B. Accordingly, a constant degree of friction is maintained the entire distance of travel of the headrest assembly providing a constant degree of friction. Additionally, the stabilizing thickness removes any slop, or excessive freedom of movement, between the components while moving the headrest assembly from the lowered position to the raised position, or vice versa.

It is appreciated herein that the rail assembly 400 may comprise additional sections having increased thickness. By example, as illustrated by FIG. 9, the top end 408 of the rail assembly 400 may be thickened $TT_{400}$ so to be secured directly to the center plate. By way of this increased thickness $TT_{400}$, the cover plate 700 is otherwise positioned within a headrest void 800 between the center plate 100 and the rail assembly 400 a remainder of the length $L_{400}$ of the rail assembly 400. The top end increased thickness $TT_{400}$ of the rail assembly may additionally serve as a stop for the headrest assembly 10 when reaching the lowered position. Specifically, the top end increased thickness $TT_{400}$ of the rail assembly 400 may engage a top side 702 of the cover plate 700 to provide a bottom limit that defines the lowered position.

While this invention has been described with reference to examples thereof, it shall be understood that such description is by way of illustration only and should not be construed as limiting the scope of the claimed examples. Accordingly, the scope and content of the examples are to be defined only by the terms of the following claims. Furthermore, it is understood that the features of any example discussed herein may be combined with one or more features of any one or more examples otherwise discussed or contemplated herein unless otherwise stated.

What is claimed is:

1. A passenger seating headrest assembly comprising:
   a headrest center plate having a backside;
   a rail assembly secured to the backside and having a pair of guides where each guide of the pair of guides is positioned at a respective lateral side of the rail assembly extending in a vertical direction;
   a mounting plate and a cover plate secured together where a pair of rollers are rotatably secured to the mounting plate or the cover plate and the pair of rollers mate with a respective guide of the pair of guides wherein the headrest center plate and the rail assembly move vertically relative the mounting plate and the cover plate; and
   a friction assembly comprising a friction leaf positioned within a void extending through a part of a thickness of the rail assembly where the friction leaf is formed from the thickness of the rail assembly.

2. The passenger seating headrest assembly of claim 1 wherein the friction leaf comprises a resistance structure and a friction leaf engaging surface; and the resistance structure forces the friction leaf engaging structure against the mounting plate.

3. The passenger seating headrest assembly of claim 1 wherein in the void the friction leaf extends from a front side of the rail assembly to a back side of the rail assembly.

4. The passenger seating headrest assembly of claim 1 wherein the rail assembly comprises a stabilizing thickness isolated at a bottom of the rail assembly and positioned adjacent to the void.

5. The passenger seating headrest assembly of claim 4 wherein a length of the stabilizing thickness is less than a length of the void.

6. The passenger seating headrest assembly of claim 4 wherein the stabilizing thickness engages the mounting plate and the cover plate an entire length of travel of the headrest center plate.

7. The passenger seating headrest assembly of claim 1 wherein the rail assembly comprises a stabilizing thickness extending a length of the rail assembly between a friction leaf engaging surface and a bottom of the rail assembly.

8. The passenger seating headrest assembly of claim 7 wherein the stabilizing thickness extends the entire width of the rail assembly with the exception of the void.

9. The passenger seating headrest assembly of claim 1 having two friction assemblies.

10. The passenger seating headrest assembly of claim 9 wherein the two friction assemblies are symmetrical about a longitudinal axis of the rail assembly extending a length of the rail assembly.

11. The passenger seating headrest assembly of claim 1 wherein the friction assembly is offset from the pair of rollers and the pair of guides in a direction of a length of the rail assembly.

12. The passenger seating headrest assembly of claim 1 wherein the rail assembly further comprises a groove positioned centrally within the rail assembly, extending in the vertical direction, and which receives a central roller having a rotational axis parallel to the rotational axis of the pair of rollers.

13. The passenger seating headrest assembly of claim 12 wherein the central roller is offset from the pair of rollers in a direction of the length of the headrest assembly.

14. The passenger seating headrest assembly of claim 12 where the central roller abuts a topside of the groove in a raised position and the central roller abuts a bottom side of the groove in a lowered position.

15. The passenger seating headrest assembly of claim 1 wherein the rail assembly comprises a top end thickness abutting the headrest center plate for securing the rail assembly to the headrest center plate.

16. The passenger seating headrest assembly of claim 15 wherein a rail assembly void is formed between the rail assembly and the headrest center plate below the top end thickness and the cover plate is positioned within the rail assembly void.

17. The passenger seating headrest assembly of claim 16 wherein a top end of the cover plate engages the top end thickness in a lowered position to define a stop for the lowered position.

18. The passenger seating headrest assembly of claim 1 wherein the friction assembly is maintained to a lower half of the rail assembly.

19. The passenger seating assembly of claim 12 wherein the friction assembly is positioned between the groove and one guide of the pair of guides.

20. The passenger seating assembly of claim 1 comprising only three rollers.

* * * * *